US007580079B2

(12) United States Patent
Miyoshi

(10) Patent No.: US 7,580,079 B2
(45) Date of Patent: Aug. 25, 2009

(54) IMAGE DISPLAY DEVICE, IMAGE DISPLAY METHOD AND IMAGE DISPLAY SYSTEM

(75) Inventor: Ryuta Miyoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 558 days.

(21) Appl. No.: 10/551,429

(22) PCT Filed: Mar. 19, 2004

(86) PCT No.: PCT/JP2004/003761

§ 371 (c)(1), (2), (4) Date: Sep. 30, 2005

(87) PCT Pub. No.: WO2004/092944

PCT Pub. Date: Oct. 28, 2004

(65) Prior Publication Data

US 2006/0279579 A1 Dec. 14, 2006

(30) Foreign Application Priority Data

Apr. 11, 2003 (JP) ............................ 2003-108132

(51) Int. Cl.
*H04N 5/445* (2006.01)

(52) U.S. Cl. ...................................................... 348/563

(58) Field of Classification Search ......... 348/563-567, 348/569; 715/777; 345/530, 548
See application file for complete search history.

(56) References Cited

U.S. PATENT DOCUMENTS 4,574,364 A * 3/1986 Tabata et al. ................ 715/798
5,305,435 A * 4/1994 Bronson ..................... 715/777
5,460,247 A * 10/1995 Fouts ........................ 188/71.1
6,378,059 B1 * 4/2002 Miyoshi ..................... 711/203

FOREIGN PATENT DOCUMENTS

| | | |
|---|---|---|
| JP | 63-136219 | 6/1988 |
| JP | 3-214268 | 9/1991 |
| JP | 4-301686 | 10/1992 |
| JP | 8-123651 | 5/1996 |
| JP | 2003-36164 | 2/2003 |
| JP | 2003-87678 | 3/2003 |

* cited by examiner

*Primary Examiner*—Paulos M Natnael
(74) *Attorney, Agent, or Firm*—Oblon, Spivak, McClelland, Maier & Neustadt, P.C.

(57) ABSTRACT

A picture display system in which a plurality of applications each render a window W on a single display includes a picture server. The picture server calculates a re-rendering range O of a window W, based on the movement, enlargement or contraction of the window W, and outputs a re-rendering request to each application rendering the window W in the re-rendering range O. With the applications, each rendering the windows W only in the re-rendering range O, the load of the re-rendering processing becomes lighter.

5 Claims, 6 Drawing Sheets

IMAGE DISPLAY DEVICE, IMAGE DISPLAY METHOD AND IMAGE DISPLAY SYSTEM

TECHNICAL FIELD

This invention relates to a system, a method and an apparatus for picture display. More particularly, it relates to a method, an apparatus and a system for superimposed display on a single display surface of a plurality of pictures generated by a plurality of independent applications.

The present invention contains subject matter related to Japanese Patent Application JP 2003-108132 filed in the Japanese Patent Office on Apr. 11, 2003, the entire contents of which being incorporated herein by reference.

BACKGROUND ART

There has so far been used a picture display system, termed a multi-window system, configured for demonstrating user interfaces of plural applications on a single display. This multi-window system is a client-server system, composed of applications for generating plural pictures and a picture server for synthesizing the pictures generated by the applications.

Among the multi-window systems, so far proposed, there is such a system in which, in case the necessity arises for re-rendering a picture within an application, a full virtual picture is re-rendered on the application, and a full virtual picture on the picture server is re-rendered with picture data of a re-rendered area to update the demonstration of a real picture surface, as disclosed in Japanese Laid-Open Patent Publication JP-A-6-250640.

This known multi-window system suffers from a drawback that, in case a window is re-rendered in an picture surface where plural applications have been displayed, it is necessary for the totality of the applications, displayed on the viewing surface, to carry out the window re-rendering, with the result that the re-rendering load increases with increase in the number of times of booting the applications.

DISCLOSURE OF THE INVENTION

It is an object of the present invention to provide a method, an apparatus and a system for picture demonstration, capable of resolving the problems inherent in the conventional technique and, more particularly, such a method, an apparatus and a system for picture demonstration whereby it is possible to relieve the load in the re-rendering processing.

For accomplishing the above object, the present invention provides a picture display apparatus comprising virtual picture storage means for storing a virtual picture, a plurality of information processing means for carrying out specified processing and for rendering a picture pertinent to the specified processing on the virtual picture, re-rendering range calculating means for calculating, in case a picture rendered by a preset one of the plural information processing means is re-rendered, the smallest range including a picture prior to re-rendering and a picture subsequent to re-rendering, as a re-rendering range, and re-rendering requesting means for requesting picture re-rendering to other information processing means rendering a picture or pictures in the re-rendering range.

The present invention also provides a picture display method for displaying pictures, generated by a plurality of applications, on a sole real picture surface, comprising a re-rendering range calculating step of calculating, in case of re-rendering a picture generated by one of the applications, the smallest range including a picture prior to re-rendering and a picture subsequent to re-rendering, as a re-rendering range, a re-rendering requesting step of requesting re-rendering of a picture to the application which has generated the picture included in the re-rendering range, and a displaying step of displaying a picture, rendered in the re-rendering step, on a real picture surface.

The present invention also provides a picture display system comprising virtual picture storage means for storing a virtual picture surface, at least one application for carrying out specified processing and for rendering a picture pertinent to the specified processing on the virtual picture surface, and a picture server for controlling the picture rendering function of the application. The picture server calculates a re-rendering range of re-rendering of the window by the application and requesting re-rendering of the re-rendering range to another application rendering a window in the re-rendering range.

Other objects and advantages of the present invention will become clearer from the following explanation of preferred embodiments thereof especially when read in conjunction with the drawings.

BEST MODE FOR CARRYING OUT THE INVENTION

Figure 1:
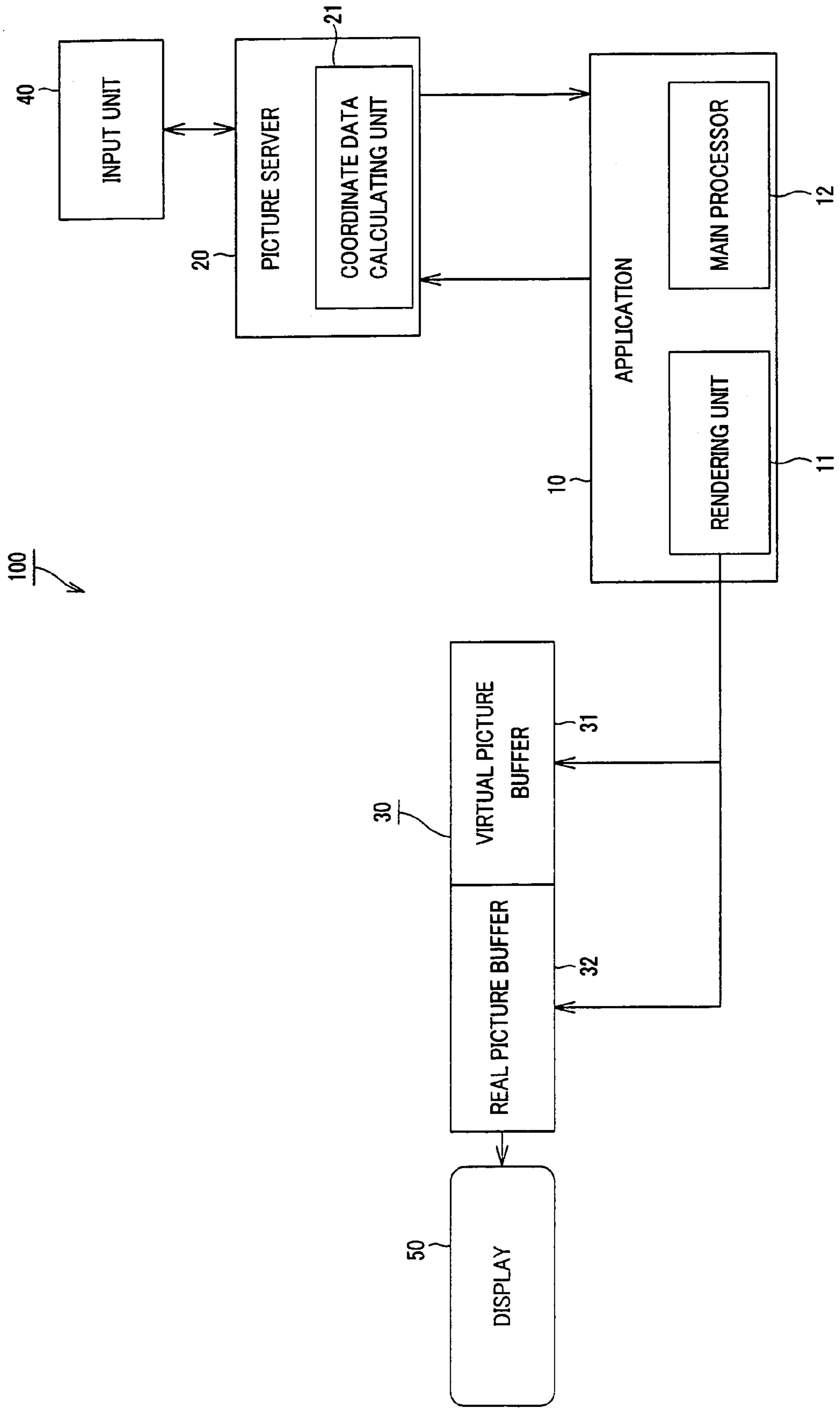
FIG. 1 is a block diagram showing the configuration of a picture display system embodying the present invention.

Referring to the drawings, a picture display system according to the present invention will now be explained in detail.

The picture display system, according to the present invention, is a multi-window system for demonstrating plural windows (pictures relating to particular processing) on a single display. In the multi-window system, a plural number of layers, each comprising a window, rendered by each application (information processing means), are superimposed together to form a single real picture. The window synthesis is carried out under control by a picture server (picture-rendering control means). The picture server calculates the range of window movement and commands only the application(s) present in the range of window movement to re-render the window(s). It is noted that the picture display system may be constructed in a single apparatus, such as a television set or a personal computer, or in plural apparatus, each comprising a physical server and a display unit.

Referring to FIG. 1, a picture display system 100 according to the present invention includes a plural number of applications 10, configured for carrying out specified processing and for generating a window pertinent to the specified processing, a picture server 20 for controlling the picture rendering functions of the applications 10 to synthesize the windows generated by the plural applications 10, a picture storage unit 30 for storage of the displayed picture, and an input unit 40, such as a remote controller or a keyboard.

The picture server 20 supervises the processing for re-rendering, carried out on the display 50. In re-rendering, a coordinate data calculating unit 21 in the picture server 20 calculates a range of window movement (range of re-rendering) based on input contents from the input unit 40. The coordinate data calculating unit 21 calculates the range of re-rendering, depending on the predetermined window movement position. This window movement position is set responsive to the current status of the window and to an input from the input unit 40. For example, if an icon on a window is clicked, a window arranged at the center of the viewing surface is moved to an end of the viewing surface, whilst another window is displayed centrally of the viewing surface. When the re-rendering range has been found by the calculations, the picture server 20 specifies an application which has generated another window arranged in the re-rendering range.

The picture server 20 also captures the re-rendering range, demonstrated on the display 50, to capture the range in a virtual picture buffer 31. The picture server 20 outputs a request for re-rendering a virtual image to the application 10 which has generated a window to be moved and to the application which has generated a window lying in a range of movement of the window.

Each application 10 includes a main processor 12 for carrying out the processing unique to the application 10, such as numerical calculations or picture processing, and a rendering unit 11 for rendering a picture necessary for processing by the main processor 12 on a virtual picture surface. The rendering unit 11 is supplied with a re-rendering request from the main processor 12 and from the picture server 20. On receipt of the re-rendering request, the rendering unit 11 overwrites the new window on the virtual picture already rendered to generate a real viewing surface on which plural windows are displayed in superposition.

The picture storage unit 30 is formed e.g. by a recording medium, such as a video card. The picture storage unit 30 includes the virtual picture buffer 31 for storing a virtual picture and a real picture buffer 32 for storing a real picture. The virtual picture buffer 31 is a work area for picture reconstruction. The virtual picture buffer 31 retains a re-rendering area of a real picture captured from the display 50. The application 10 re-renders the virtual picture. The picture storage unit 30 transmits the virtual picture, obtained on complete re-rendering by the totality of the applications, to the real picture buffer 32 for demonstration of the display 50.

Figure 2:
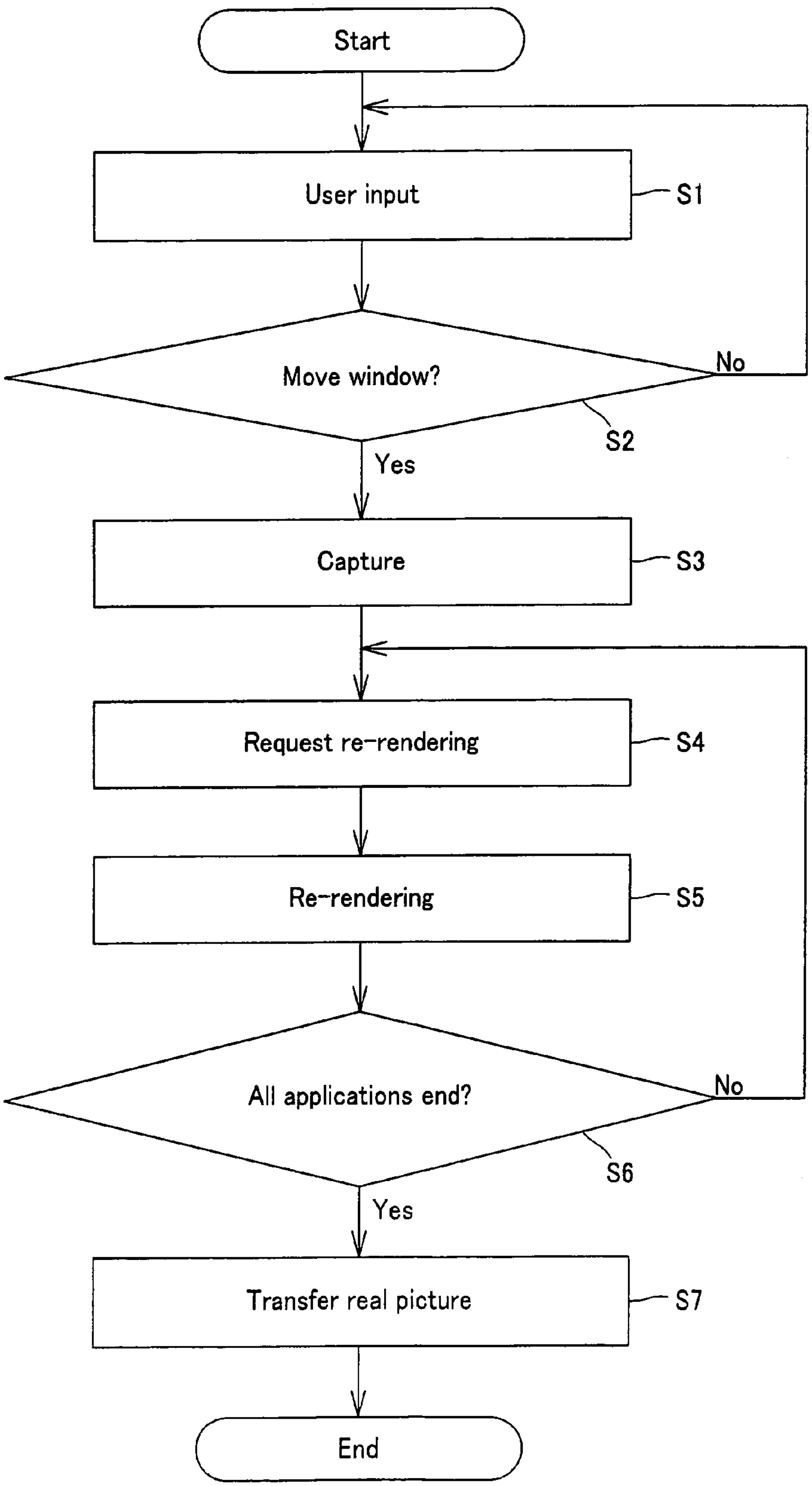
FIG. 2 is a flowchart showing the sequence of operations for window re-rendering processing.
Figure 3:
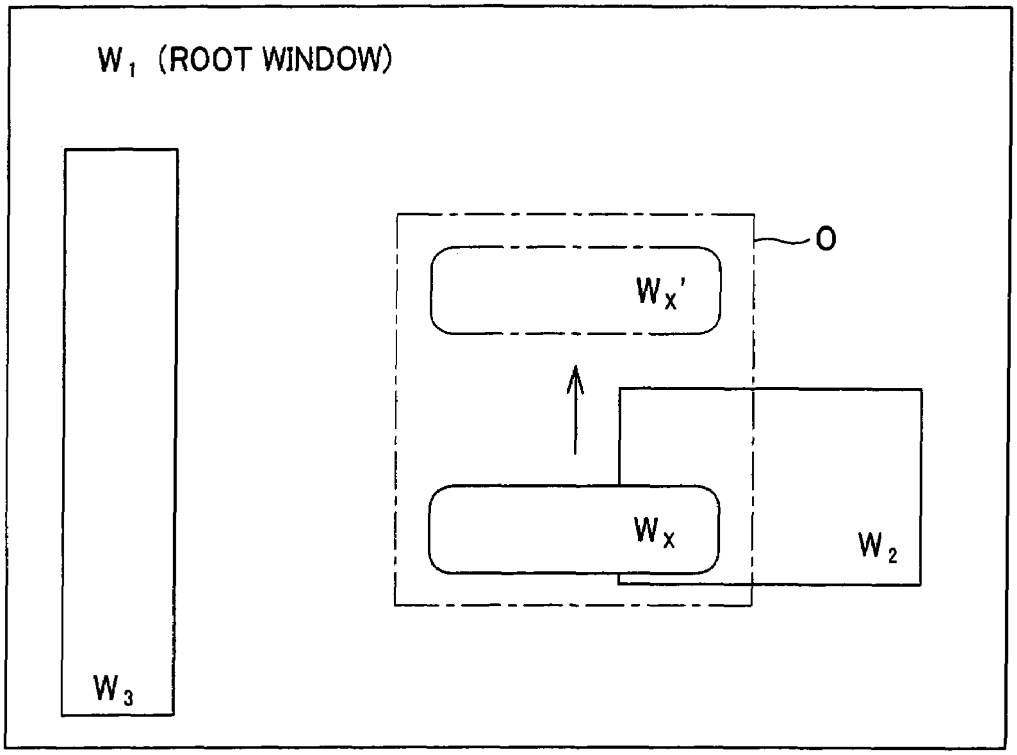
FIG. 3 is a plan view showing several windows demonstrated on a display.

Referring to FIGS. 2 to 4, the operation of the above-described picture display system 100 will now be explained.

FIG. 2 shows the operational sequence for re-rendering in the picture display system 100. When the user acts on the input unit 40, such as remote controller or keyboard, by way of issuing a command for particular processing (step S1), the picture server 20 checks for whether or not a window is to be moved, while calculating the range of window movement, that is, the re-rendering range (step S2). If the window is to be moved (YES in step S2), the picture server 20 commences the re-rendering of the picture and captures the re-rendering range of the picture demonstrated on the display 50 for storage in the virtual picture buffer 31 (step S3). On the other hand, if no window movement is detected in the step S2 (NO in step S2), the picture server is in a state of waiting for user input.

The picture server 20 then specifies the applications 10 which have rendered the windows in the re-rendering range, and outputs a window re-rendering request to the one 10 of the so specified applications which lies in the lowermost layer (step S4). The application 10, which has received the re-rendering request from the picture server 20, re-renders the virtual picture. It is solely for the window movement range (re-rendering range) that the application effectuates the re-rendering. On completion of the re-rendering of the virtual picture, the application 10 notifies the picture server 20 of the end of the re-rendering (step S5).

On receipt of the notification of the completion of the re-rendering, the picture server 20 checks whether or not the totality of the applications 10 has completed the re-rendering. Should there be any application(s) 10 to which the picture server 20 has not output the re-rendering request (NO in step S6), the picture server outputs a re-rendering request to the one 10 of the applications 10 lying in the lowermost layer. On the other hand, when the re-rendering request to the totality of the applications 10, specified in the step S4, is completed (YES in step S6), the picture server transmits the pictures stored in the virtual picture buffer 31 to the real picture buffer 32 (step S7).

Thus, with the picture display system 100, embodying the present invention, re-rendering is carried out only for the re-rendering range, and hence the re-rendering range as well as the number of the applications 10 undertaking the re-rendering may be reduced to enable lighter load for re-rendering processing. For example, if, in a viewing surface, shown in FIG. 3, a window $W_x$ is to be moved to the location of a window $W_x'$, a window $W_3$ is not included in a re-rendering range O. Consequently, the processing for re-rendering for the window $W_3$ may be dispensed with. In addition, only the re-rendering range O needs to be re-rendered for each of the windows $W_1$, $W_2$ and $W_x$, and hence the re-rendering processing load for these windows may also be lighter.

Figure 4A:
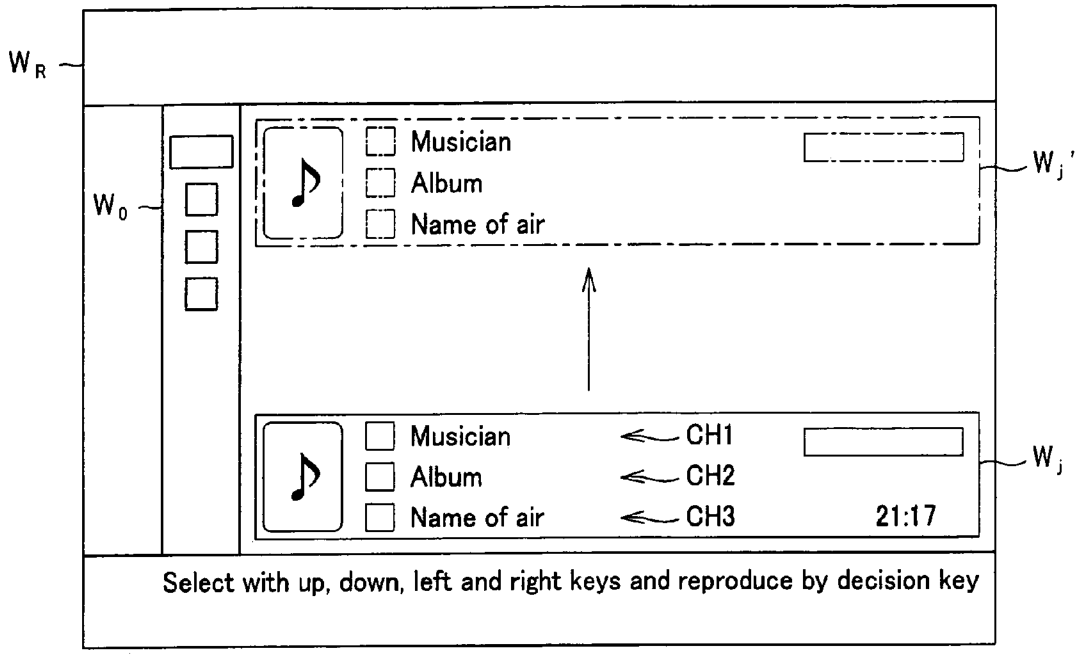
FIGS. 4A and 4B are plan views showing display states of a viewing surface on which the 'move' processing is carried out.
Figure 4B:
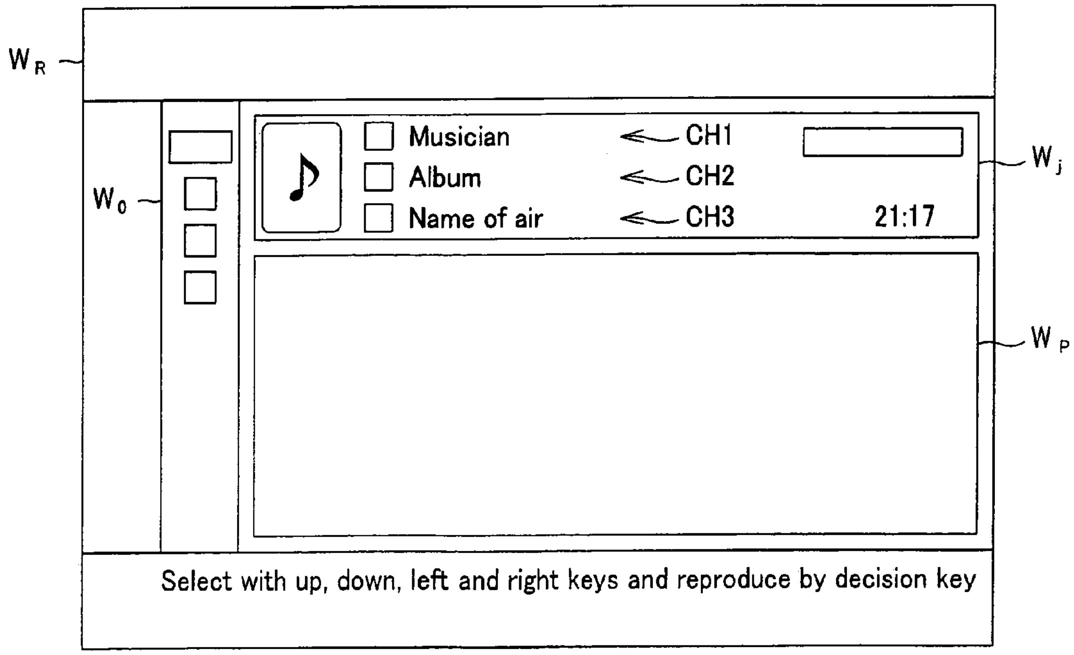

The processing 'move' for the windows, as a specified embodiment of the above-described re-rendering processing, will now be explained. This window 'move' processing is the processing of causing successive pixel-by-pixel movement of the window. FIGS. 4A and 4B show an illustrative display surface subjected to this move processing. In this display surface, there is provided a vertically elongated window $W_0$ on the left hand side of a root window $W_R$. On the lower mid part of the display surface, there is displayed a window $W_J$ to be moved. In this window $W_J$, there are arrayed a check box $CH_1$ for specifying the designation of the name of a musician, a check box $CH_2$ for specifying the designation of the name of an album and a check box $CH_3$ for specifying the display of the name of a musical air. If, as shown in FIG. 4B, any one of the check boxes $CH_1$ to $CH_3$ is checked on the viewing surface, the window $W_J$ is moved to an upper part of the viewing surface, and a window $W_P$ for displaying the specified information is rendered in a lower part of the display surface below the window $W_J$.

Meanwhile, the location the window $W_J$ is moved to by acting on the check boxes $CH_1$ to $CH_3$ is predetermined. The coordinate data calculating unit 21 calculates the re-rendering range based on this predetermined movement location. The present invention is desirably applied to picture processing in which the applications 10 perform predetermined picture processing, because the re-rendering range can readily be calculated with the predetermined picture processing.

Figure 5:
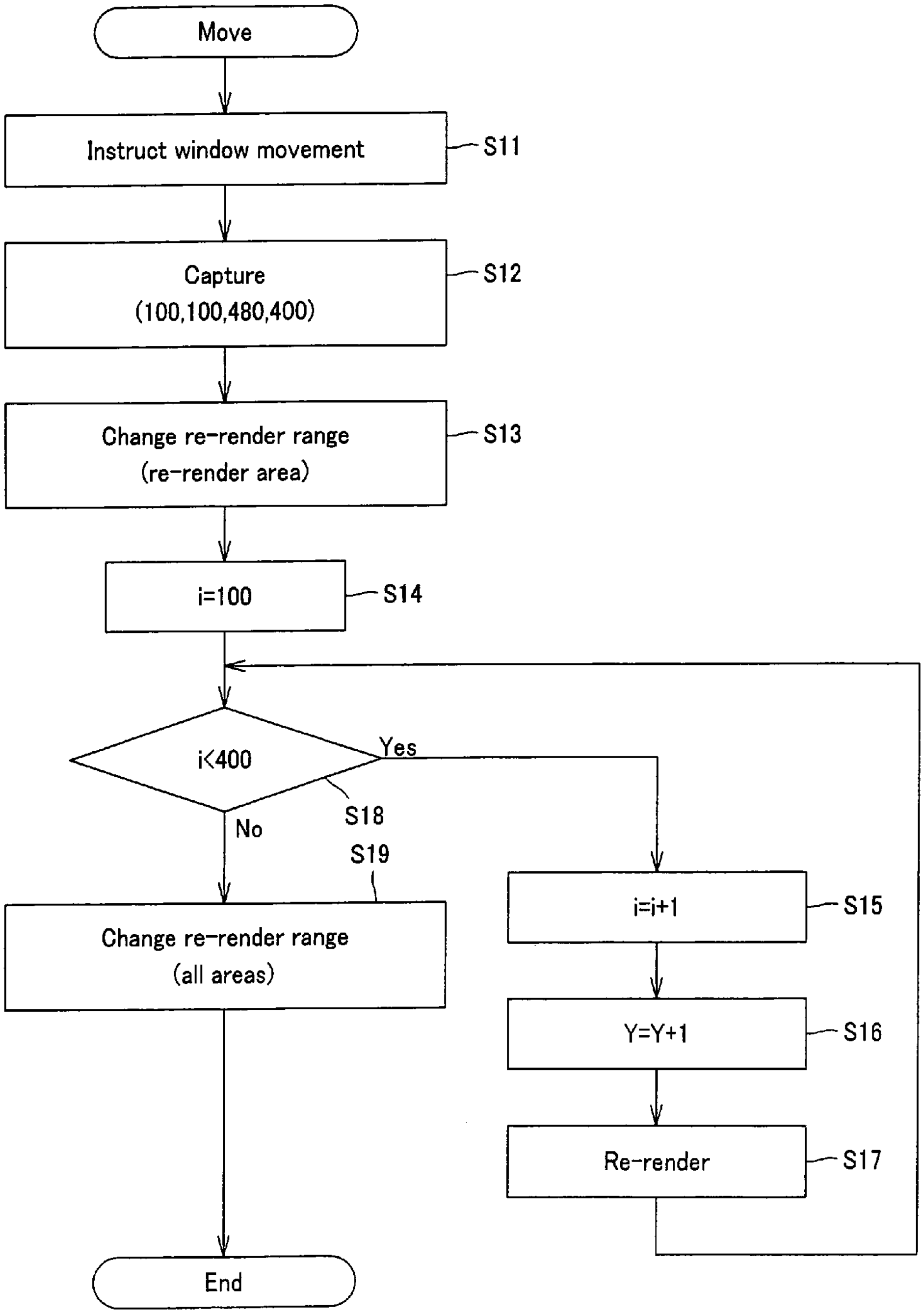
FIG. 5 is a flowchart showing the sequence of operations for 'move' processing.
Figure 6:
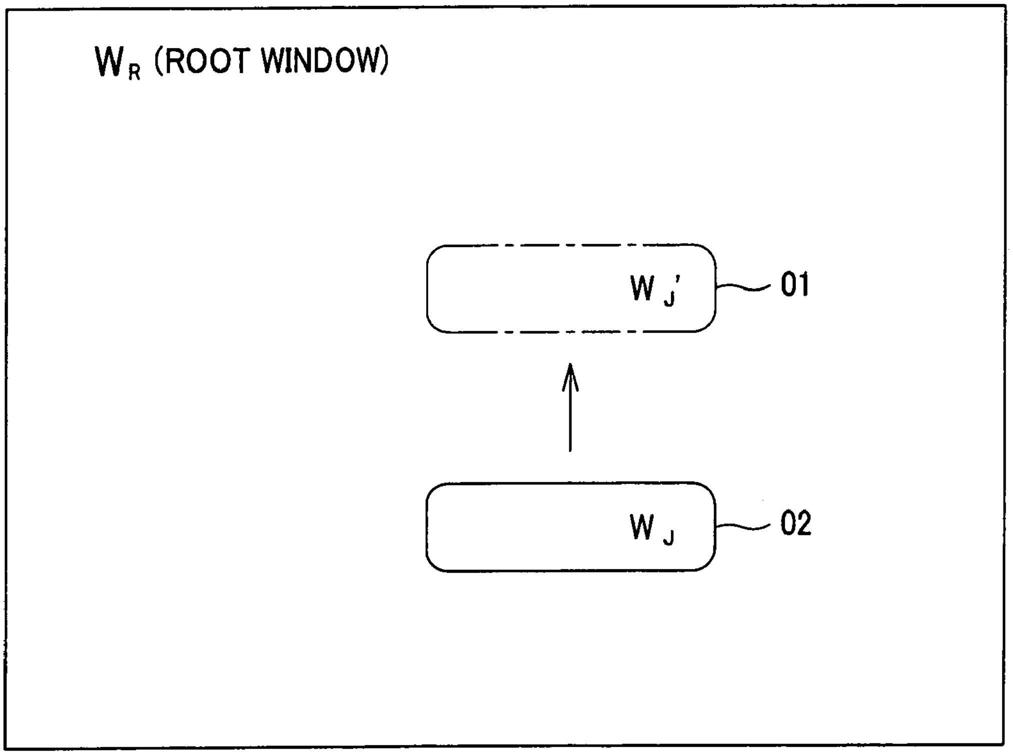
FIG. 6 is a plan view showing an illustrative configuration of plural windows demonstrated on a display.

FIG. 5 depicts a flowchart showing the 'move' processing of the window $W_J$. When any one of the check boxes $CH_1$ to $CH_3$ is checked, the picture server 20 commences the 'move' processing, as shown in FIG. 4B (step S11). When the 'move' processing is commenced, the coordinate data calculating unit 21 calculates the range of movement of the window $W_J$.

More specifically, the range of movement of the window $W_J$ is calculated as coordinates on a display surface W. On this display surface W is imaginarily set a coordinate system, having a horizontal direction as an X-axis and a vertical direction as a Y-axis, with the upper left corner of the display surface W as a point of origin. The location of the window $W_J$ in this coordinate system represents the coordinate of the upper left corner of the window $W_J$ in the coordinate system.

By the pushing of any one of the check boxes $CH_1$ to $CH_3$, the position of the window $W_J$ is moved from a coordinate (100, 100) to a coordinate (100, 400). Since the window $W_J$ is of a width of 300 and a height of 80, the area of movement O of the window $W_J$ may be calculated to be a rectangle (100, 100, 480, 400).

The picture server 20 captures the area of movement O of the window $W_J$, as the re-rendering range O, into the virtual picture buffer 31 (step S12), and sets a picture to be re-rendered in the re-rendering range O stored in the virtual picture buffer 31 (step S13). The picture server 20 then sets the initial value of a counter i to 100 (step S14) by substituting a pre-movement Y-coordinate of the window $W_J$. The picture server 20 increments the value of the counter i by 1 (step S15) and subsequently increments the Y-coordinate of the window $W_J$ by 1 (step S16). In case the value of Y is incremented by 1, the window $W_J$ is moved by one pixel along the direction of the Y-axis.

The picture server 20 outputs a re-rendering request to each of the applications 10 present in the re-rendering range O. There are a root window $W_R$ and the window in transit $W_J$ in the re-rendering range O. The picture server 20 first outputs a re-rendering request to the application of the lower layer, that is, the application 10 rendering the root window $W_R$. On the oncoming of the rendering end message from this application 10, the picture server outputs a re-rendering request to the application 10 rendering the window $W_J$ (step S17). The picture server 20 keeps on to output the re-rendering request to the two applications 10 until the value of i is equal to 400 (YES of step S18). During this time interval, the window $W_J$ is moved pixel by pixel along the Y-axis direction until ultimately the window is rendered at a location of Y=400. When the value of the counter has reached 400, such that the movement of the window $W_J$ comes to a close (NO of step S18), the picture server 20 cancels the setting of the re-rendering range O (step S19) to terminate the 'move' processing.

According to the present invention, described above, the re-rendering of the virtual picture is carried out only for the application(s) 10 present in the range of the window movement when the movement of the window W has occurred. In the 'move' processing, the picture is re-rendered only for the pixels through which the window $W_J$ has been moved. Thus, in case the virtual picture is re-rendered frequently, as in the case of 'move' processing, the re-rendering load becomes appreciably lighter by decreasing the number of the applications 10 carrying out the re-rendering.

An embodiment in which different re-rendering ranges are set will now be explained. In the present embodiment, the processing of re-rendering is such a processing in which only the rendering range of a pre-movement window $W_J$ and the rendering range of a post-movement window $W_J'$ represent the re-rendering range O. By 'jump' is meant the processing in which a window is moved at a time to a displaced position. In the present embodiment, the window $W_J$ at the lower part of the drawing jumps to the position of the window $W_J'$ at the upper part of the drawing.

The re-rendering range O of the window in the present embodiment is made up by two areas, namely a rendering range $O_1$ of the pre-jump window $W_J$ and a rendering range $O_2$ of the post-movement window $W_J'$. In the rendering range $O_1$, only the root window $W_R$ is rendered. In the rendering range $O_2$, the root window $W_R$ and the window $W_J'$, which is to jump, are rendered. The picture server outputs a re-rendering request for re-rendering the root window $W_R$ to the rendering range $O_1$, while outputting a re-rendering request for re-rendering the root window $W_R$ and the window $W_J$ to the rendering range $O_2$.

In case the rendering range $O_1$ of the pre-jump window $W_J$ and the rendering range $O_2$ of the post-movement window $W_J'$ are the re-rendering range O, the re-rendering range O is reduced in area, while the number of the applications present in the re-rendering range O becomes smaller, with the result that the number of times of re-rendering is diminished.

In the above-described embodiment, the case of window movement has been explained. The present invention may also be applied to enlarging or reducing the window frame or to scrolling. In case the window frame is enlarged or reduced, the so enlarged or reduced-portion is the re-rendering range. In scrolling, the scrolling range is the re-rendering range. The picture server 20 specifies the application 10, rendering a window, in the re-rendering range, and outputs a re-rendering request.

In the above-described embodiment, the entire applications co-own a single virtual picture. However, the respective applications 10 may co-own respective virtual pictures, and the virtual pictures, generated by the applications 10, may be synthesized by the picture server 20. Alternatively, the picture server 20 may generate plural pictures, in a lump, instead of the respective applications generating the pictures.

In case the window system is configured for directly displaying the re-rendering process on a real picture surface, such a visual effect may be generated in which the pre-movement window is gradually erased or the post-movement window is gradually displayed.

The present invention is not limited to the above embodiment explained with reference to the drawings and, as may be apparent to those skilled in the art, a variety of changes, substitutions or equivalents may be undertaken without departing from the scope of the invention.

INDUSTRIAL APPLICABILITY

According to the present invention, described above, in which re-rendering is only for the re-rendering range of a picture, the rendering area for the information processing means may be reduced, thus leading to a lighter load on the information processing means responsible for re-rendering. Moreover, a re-rendering request is made only to the information processing means rendering a picture in the re-rendering range, thus leading to a reduced number of times of re-rendering operations and to a lighter load needed for re-rendering.

In addition, with the present invention, plural information processing means perform re-rendering on the single virtual picture surface, it is possible to reduce the area needed for storing the virtual picture surface.

The invention claimed is:

1. A picture display apparatus comprising:

virtual picture storage means for storing a virtual picture;

a plurality of information processing means for carrying out specified processing and for rendering a picture pertinent to said specified processing on said virtual picture;

re-rendering range calculating means for calculating, in case a picture rendered by a preset one of said plural information processing means is re-rendered, only a smallest range of pixels including a picture prior to re-rendering and a picture subsequent to re-rendering, as a re-rendering range; and re-rendering requesting means for requesting picture re-rendering to other information processing means rendering only a picture or pictures in said re-rendering range, said re-rendering requesting means requesting picture re-rendering at each pixel location in the re-rendering range as the picture is moved from the picture prior to re-rendering to the picture subsequent to re-rendering.

2. The picture display apparatus according to claim 1 wherein a rendering position for a picture rendered by said information processing means is predetermined and wherein said re-rendering range calculating means calculates the re-rendering range based on a predetermined rendering position.

3. A picture display method for displaying pictures, generated by a plurality of applications, on a sole real picture surface, comprising:

calculating, in case of re-rendering a picture generated by one of said applications, only a smallest range of pixels including a picture prior to re-rendering and a picture subsequent to re-rendering, as a re-rendering range;

requesting re-rendering of only a picture to the application which has generated the picture included in said re-rendering range, said requesting including requesting re-rendering of the picture at each pixel location in the re-rendering range as the picture is moved from the picture prior to re-rendering to the picture subsequent to re-rendering; and displaying a picture, rendered in said requesting, on a real picture surface.

4. The picture display method according to claim 3 wherein a rendering position for a picture rendered by said one of said applications is predetermined and wherein said calculating includes calculates the re-rendering range based on said predetermined rendering position.

5. A picture display system comprising:

virtual picture storage means for storing a virtual picture surface;

at least one application for carrying out specified processing and for rendering a picture pertinent to said specified processing on said virtual picture surface; and a picture server for controlling the picture rendering function of said application;

said picture server calculating a re-rendering range of only re-rendering of a window by said application and requesting re-rendering of only said re-rendering range to another application rendering said window in said re-rendering range, and said picture server requesting picture re-rendering at each pixel location in the re-rendering range as the picture is moved from the picture prior to re-rendering to the picture subsequent to re-rendering.

* * * * *